Jan. 15, 1946. G. H. COTE 2,392,809
SELF-RELEASING TOOL HOLDER
Filed Dec. 24, 1943
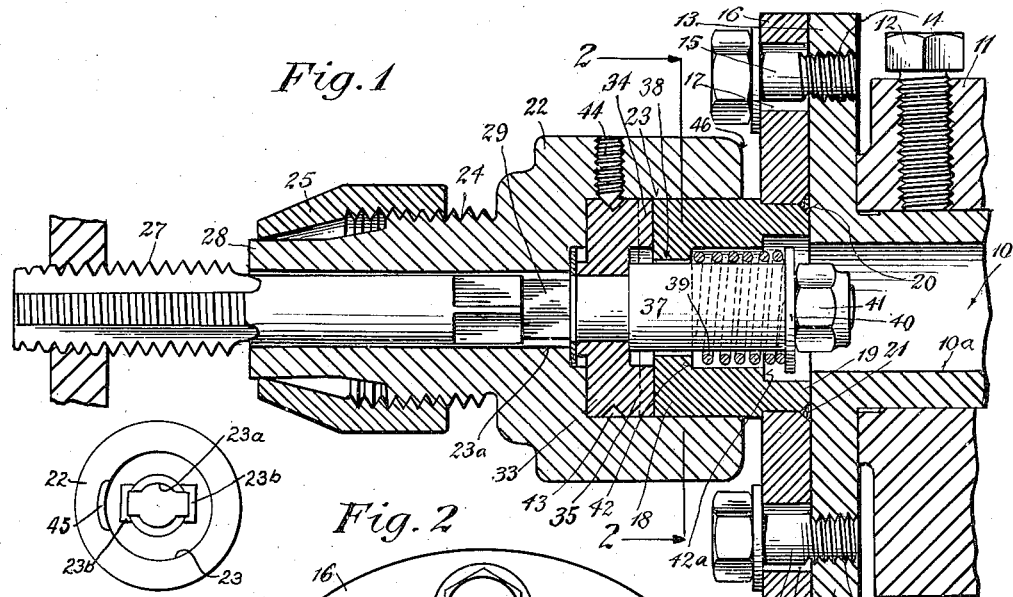
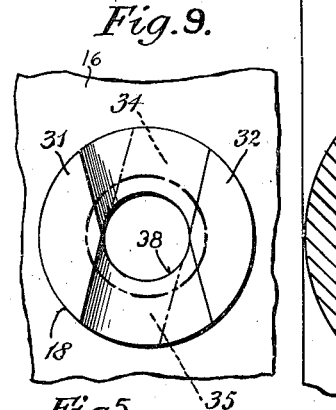
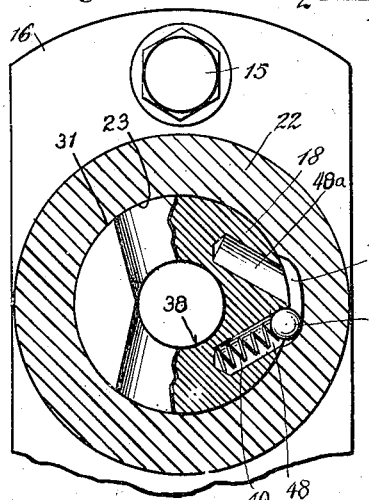
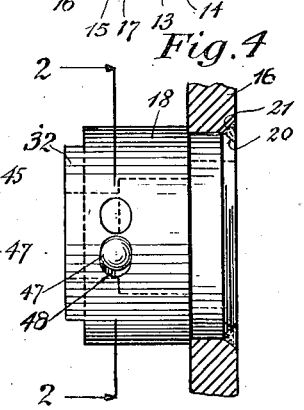
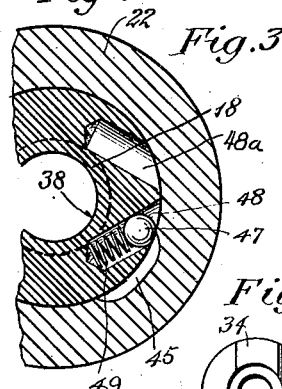
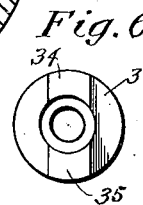
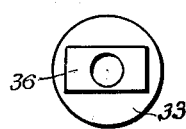
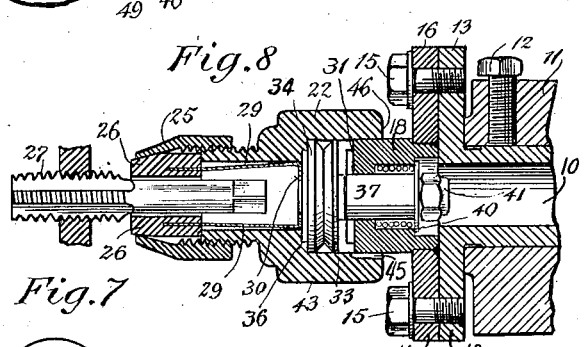
INVENTOR
*George H. Cote*
BY *Johnson & Kline*
ATTORNEYS Patented Jan. 15, 1946

2,392,809

UNITED STATES PATENT OFFICE 2,392,809

SELF-RELEASING TOOLHOLDER

George H. Cote, Bridgeport, Conn.

Application December 24, 1943, Serial No. 515,569

9 Claims. (Cl. 10—89)

This invention relates to tool holders of the type adapted for use in automatic screw machines, turret lathes, and the like, and more particularly to releasing holders of this type.

In the production of various parts from screw and similar machines a frequent cause of breakage of tools and unsatisfactory work is eccentricity and/or misalignment of the tool with the work as the latter is held in the machine. Disregarding carelessness in setting up of the machine, much of this misalignment or eccentricity is the fault of the releasing tool holder and of the manually or automatically operating structures carrying said holders, all of which function to position and manipulate the tools. Even though the initial setting of the tools might be satisfactorily performed, heretofore eccentricity in many cases apparently unavoidable, developed after the machine had begun to operate.

I have discovered that in releasing tool holders, this latter condition is often due to the tools therein assuming different rotative positions when repeating their operations on succeeding pieces of work, these different positions causing eccentricity and/or misalignment of the tool, since the relatively movable parts do not have a definite and constant relation to each other. Where relatively rotatable parts are involved, as here, the establishment and maintenance of accurate concentricity and coaxial alignment of them in all angularly different positions are difficult to effect even though the parts are made with normal toolmaker's precision. Theoretically with extremely accurate machining and micro-finishing operations it could be effected, but the cost would be prohibitive and this precludes use of such methods.

It is an object of the present invention to provide an improved releasing tool holder which obviates the above disadvantages by permitting initial alignment of the tool to be accurately and conveniently carried out and by functioning to repeatedly return the tool to this same correct alignment for accomplishing work after the releasing operations of the holder have taken place. This obviates the necessity of resorting to costly high precision machining and finishing operations.

In the embodiment shown herein the tool holder is used for tapping purposes. A chuck holding a tap is adjustably mounted for convenient setting on a supporting member so that initial correct alignment of the tap with the work may be readily effected, the chuck being releasably locked against rotation with respect to said supporting member and advancing for release and turning after the tap has finished its cutting. Upon the spindle of the machine reversing its rotation to free the work from the tap, a novel and improved single position clutch or brake mechanism operates to hold the chuck stationary at or adjacent its initial rotative position where the tap had been adjusted to correct alignment with the work. As the tap becomes free of the work, the tool holder returns the tap to a retracted position so that when it next begins cutting it will take the exactly identical position it initially had and be applied in the same correct alignment for repeating its cutting.

A feature of the invention is the provision of an improved releasing tool holder as above set forth wherein the single position clutch which becomes operative for locking upon reversing of the machine spindle rotation continues its functioning during the full retracting axial movement of the chuck, so that the tool is at all times held in initial correctly aligned position, and so that proper re-engagement of the releasable locking means readily takes place.

The above object is accomplished with a minimum number of working parts cooperating in a novel manner as pointed out below, and the improved clutch mechanism is adaptable for use with both right hand and left hand threading tools by a simple relocation of parts.

Other features and advantages will hereinatfer appear.

In the accompanying drawings showing one embodiment of the invention—

Figure 1 is an axial sectional view showing the improved tool holder with a tap, in cutting position.

Fig. 2 is a fragmentary view in transverse section on the line 2—2 of Fig. 1, but with the chuck body in advanced position and the single position clutch in locking position.

Fig. 3 is a fragmentary transverse section similar to that of Fig. 2, but showing operation of the single position clutch during reversed rotation of the chuck body.

Fig. 4 is a side elevation of the supporting hub or bushing of the holder.

Fig. 5 shows a front elevation of the bushing.

Fig. 6 is a detail showing the locking head of the holder in rear elevation.

Fig. 7 is a detail of the locking head in front elevation.

Fig. 8 is an axial sectional view of the improved holder with the chuck and chuck body in extended position.

Fig. 9 is a rear end elevation of the chuck carrier body of the holder.

Referring to Fig. 1, the tool holder embodying the present invention has a shank 10 adapted to extend into a turret or other machine structure 11 and be held therein by a suitable set screw 12. To provide for convenient initial setting of the chucking means and tool of the holder, the projecting end of the shank 10 has a two-eared flange 13 having threaded apertures 14 to receive screws 15, and a complementary flange 16 is provided having apertures 17 aligned with the threaded apertures 14 so that the two flanges may be rigidly screwed together, the apertures 17 having a larger diameter than that of the screws 15 to permit limited adjustment between the two flanges.

The flange 16 is provided with a chuck-supporting hub or bushing 18 extending laterally thereof, the bushing being fastened by means of a neck portion 19 of reduced diameter pressed into a central aperture in the flange 16. The neck 19 has a bevelled edge 20, and the central aperture of the flange 16 is countersunk at the rear face of the flange to facilitate welding the two pieces together, as at 21, to provide a rigid unitary structure.

For the purpose of mounting a tool on the bushing 18 there is provided a chuck body 22 having at one end a large bore 23 slidably receiving and bearing on the bushing, the other end of the chuck body being of smaller diameter with a bore 23a, and having external threads 24 carrying a chuck nut 25 and clamping chuck jaws 26 so as to hold a tap 27, which is shown as being right-hand.

The small end of the chuck body 22 has extensions 28 which guide the chuck jaws 26 in the usual manner so that the nut 25 may be screwed up tightly to close the jaws without turning same. To move the chuck jaws 26 apart when the nut 25 is unscrewed, there is provided a double bladed U-shaped spring 29 located within the chuck body 22, the blades of said spring extending into slots cut into the jaws, see Fig. 8, and said spring being normally biased outwardly. Preferably, the flat yoke portion 30 of the spring is shaped substantially like a washer, being centrally apertured to provide a more uniform flexing thereof when the jaws 26 are being operated.

As shown in Figs. 1 and 8, the chuck body 22 is mounted on the bushing 18 so that when necessary it can rotate about same and the bearing surfaces of the body and bushing are hardened, ground and finished to provide as precise a bearing as possible within practical limitations.

In threading operations performed with taps and dies, tool holders of the so-called releasing type, such as the type of the holder of the present invention, operate to apply a tool to the work, being rotated in a machine, so that a thread is cut at the desired points. Generally the tool holder and threading tool are advanced during the thread cutting operation by a turret or other supporting structure of the machine. At a point immediately prior to completion of the thread cutting, the turret ceases to advance and the remainder of the cutting operation causes the chuck to advance, relatively to its support, to a point where it is released and may turn with the work. Then the spindle which rotates the work is reversed and the turret returns. During reversal of the spindle and work, the chuck and tool are held against turning so that the tool will unscrew and disengage itself from the work, whereupon the chuck and tool are returned to retracted position in readiness for threading the next piece of work.

The chuck and tool are held against turning during thread-cutting by cooperating clutch parts carried by the movable and stationary parts of the chuck.

It has frequently occurred, that even though in the initial setting the tool and work are in satisfactory alignment, in a subsequent operation the tool would often be so far out of alignment with the work, that broken tools and unsatisfactory work would result.

I have found that this occurs because the rotatable and relatively stationary parts of the chuck have different rotative positions in which they may be clutched and that due to unavoidable tolerances in the making of the parts, in these different positions the tool is liable to be out of line with the work.

According to the present invention there is provided an improved releasing tool holder which obviates the above difficulties by permitting convenient and accurate initial setting of the tool and functioning to repeatedly return the chuck and cutting tool to the same relative positions as in the initial setting to be there clutched for the succeeding cutting operation. More specifically stated, the invention provides a novel and improved clutch means for controlling movement of the chuck body 22 relatively to the bushing 18, whereby during the reverse rotation of the work to release the cutting tool therefrom, the chuck body is maintained in such position that when the body 22 and bushing 18 reengage they will have the same relative rotative position they had initially. This novel controlling means includes an improved balanced forward-drive clutch and a co-functioning single-position reverse-drive clutch adapted to become operative when the forward-drive clutch releases and the direction of rotation of the body is reversed.

Referring to Figs. 4 and 5, the front face of the bushing 18 is provided with a pair of oppositely disposed similarly shaped lugs 31 and 32, said lugs being formed by making two diametric milling cuts in the face, preferably at an angle of 30° to each other. Adapted to cooperate with the lugs 31 and 32, there is provided a disk 33 carried within the large bore 23 of the chuck body, said disk having a pair of projections 34 and 35 similar to each other and oppositely disposed on the rear face thereof, adjacent the bushing 18. The projections 34 and 35 preferably each have parallel sides shaped so that alternate sides of the projections engage alternate sides of the lugs 31 and 32 for preventing rotation of the disk with respect to the bushing 18. The periphery of the disk 33 is accurately machined so that it fits snugly in the bore 23 of the chuck body, and for the purpose of preventing rotation between said disk and body, the latter is provided with broached recesses 23b at the inner end of the bore 23, and the front face of the disk is provided with a projection 36 extending into the broached portion of the body, preferably with a close fit.

The circumference of the disk 33 is provided with a V-groove 43, and the chuck body 22 with a plurality of headless V-point set screws 44 which engage the V-groove to firmly secure the disk 33 in the body against movement. The disk 33 and the bushing 18 thus constitute a balanced-drive clutch which functions to hold the chuck body 22 and a tap 27 against forward turning during the cutting operation of the latter.

At the end of the turret feeding operation, the chuck body advances axially along the bushing and lugs 31 and 32 disengage the projections 34 and 35. The body 22 and tap are then free to rotate with the work, thus terminating the thread-cutting operation.

It will be noted that when the disk 33 is clutched to the bushing 18 and restrained from turning thereby, clearance exists between the alternate sides of the projections 34 and 35 and the corresponding sides of the lugs 31 and 32 of the bushing. Thus, there is a certain amount of rotative play in the clutch, which is an important feature as will be hereinafter brought out. The engaging surfaces of the lugs 31 and 32 and the projections 34 and 35 are comparatively large and substantial, and tend to firmly hold the chuck body 22 and tap 27 in initial adjusted position, and to resist wear to a great extent during use of the tool holder.

It will be seen that, due to the alternate or diametrically opposite faces of the lugs 31 and 32 engaging similarly disposed faces of the projections 34 and 35, a balanced pressure is exerted by the bushing 18 on the disk 33 and consequently on the chuck body 22 to prevent forward turning thereof during the advancing cutting operation of the tap 27. This balanced pressure tends to aid the maintaining of proper adjustment of the tap with the work.

For the purpose of yieldably holding the chuck body 22 in retracted locked position on the bushing 18, the disk 33 is provided with a central stud 37 rigidly fastened thereto and extending into a central bore 38 in the bushing 18, said stud carrying a helical coil spring 39 having one end engaging a washer 40 held on the inner end of the stud by a nut 41 and having the other end engaging a shoulder 42 in the bore 38. The shank 10 of the tool holder is provided with a central bore 10a to provide clearance for the nut 41, and the bore 38 of the bushing is made large at the mouth to clear the washer 40, and to form a shoulder 42a for engaging said washer when the chuck body 22 is in maximum extended position. The shoulder 42a and washer 40 thus function as a stop to limit axial extending movement of the body 22 on the bushing 18 to a position where the disk 33, and consequently the body 22, is disengaged from the bushing, and preferably the stud 37 is of sufficient length so that said disengagement occurs, to permit turning of the body 22 and tap 27, while the washer 40 is still spaced an extent from the shoulder 42a.

The improved means for controlling the movement of the chuck body 22 on the hub 18 further includes, according to the present invention, what may conveniently be termed a single-position positive reverse drive clutch, which functions upon release of the forward drive clutch, just described, to permit free forward turning of the chuck body 22 and tap 27 on the bushing 18 and thus terminate the cutting operation and which during the reverse rotation of the spindle and work in the machine to disengage the work from the tap limits the reverse turning of the body on the bushing and locks it in a rotative position adjacent its initial adjusted setting, and maintains it thus during the unscrewing of the work therefrom, preventing damage to tap and work. Moreover, upon release of the tap 27 from the work, the chuck body and tap are returned to retracted position at substantially their initial rotative setting, and in their initial adjusted alignment to repeat the cutting operation.

This single-position clutch, referring to Figs. 2 and 3, is formed, in the embodiment of the invention illustrated herein, by providing the chuck body 22 with a groove 45 in the large bore 23 thereof, the groove having a shape substantially as shown in Fig. 2, and extending inwardly along the bore from the rear face 46 of the chuck body. Cooperating with the groove 45 there is a hardened steel ball 47 carried in a deep cylindrical recess 48 in the bushing 18, see Figs. 2 and 4, said ball being yieldably urged outwardly of the recess and against the chuck body 22 by a helical coil spring 49. As seen in Fig. 2, the ball 47 is engaging one side of the groove 45 and also one side of the recess 48 in the bushing 18. As a result, counterclockwise rotation of the chuck body 22 about the bushing 18 is prevented at this position, due to the ball 47 jamming between said surfaces as turning pressure is applied. However, the chuck body 22 may be rotated in a clockwise direction about the bushing 18. When the opposite end of the groove 45 engages the ball 47, Fig. 3, it pushes the latter into the recess 48 so that it cannot jam between two approaching surfaces and interfere with turning of the body, and in this case the bore 23 of the body functions in the manner of a race for the ball 47.

At present I prefer to shape the ends of the groove 45 to a radius approximately half again as great as the radius of the ball 47, in order to effect a positive locking against counter-clockwise rotation of the chuck body 22 on the bushing 18 while at the same time permitting unimpeded turning of said body about the bushing in a clockwise direction.

The recess 48 in the bushing 18 is located relatively to the lugs 31 and 32 thereof as shown in Figs. 2 and 4, and the groove 45 in the bore 23 of the chuck body is located in the plane of the broached recesses 23b in said body, see Fig. 9, so that when the body is located and held by the ball against counter-clockwise rotation on the bushing 18, the projections 34 and 35 of the disk 33 are centralized with respect to the lugs 31 and 32. I have found that by so doing, and as a result of providing clearance between the lugs 31 and 32, and the projections 34 and 35 as aforementioned, the tap 27 and chuck body 22 when withdrawn from the work will immediately be snapped by the spring 39 to fully retracted position on the bushing 18, with the projections 34 and 35 fully extending between the lugs 31 and 32 in readiness for engagement of the sides thereof to lock the chuck body on the bushing for the next cutting operation. By forming the lugs 31 and 32 with two milling cuts made at a 30° angle to each other, as at present preferred, the clearances in the forward-drive clutch are sufficient to eliminate interference between the said lugs and projections during the retracting movement of the chuck body, which might prevent locking of same on the bushing 18 and the backlash in the clutch in no way adversely affects its proper functioning. At the same time, the clearance in the clutch is not great enough to permit the different rotative positions made possible thereby to throw the tool out of alignment with the work to any appreciable extent.

The length of the groove 45 is preferably greater than the axial movement permitted the chuck body 22 on the bushing 18, and it should be noted that the locking action of the ball 45 continues during relative axial movement between the chuck body and the bushing.

It will be seen that, although the forward drive clutch as formed by the bushing 18 and disk 33 is capable of engagement in either of two positions, it will always be engaged in only one of said two positions due to the locking of the chuck body 22 by the ball 47 and groove 45 in always the same identical rotative position during the reverse rotation of the work.

The tool holder of the present invention thus functions to eliminate tool breakage and work damage by providing for accurate initial setting of the tool and maintenance of said accurate setting during the functioning of the holder in applying the tool to, and removing it from the work.

It will be further noted that, after the retracting movement of the chuck body 22 has taken place, the projections 34 and 35 will be located approximately midway between the lugs 31 and 32. At the moment that the tool holder again applies the tap 27 to the next piece of work, the turning force exerted by the work on the tap will cause the alternate sides of the projections to forcibly engage the corresponding sides of the lugs with a certain amount of impact. The construction as provided by the present invention tends to keep this impact to a low safe value where it will not cause excessive wear of the engaging surfaces. Referring to Fig. 5, it will be seen that the engaging surfaces of the lugs and projections are in a non-radial line, and therefore a camming effect is introduced. In other words, the relative direction of movement of the surfaces is not normal to the surfaces at the moment of impact, and therefore the blow is a glancing one. This results in longer life for the parts subject to wear, and a greater accuracy in the overall product, and is a feature of the invention.

Where the tool holder of the present invention is to be used with left-hand thread tools, the locking direction of the single position clutch should be reversed, to permit free turning of the chuck body 22 when in extended position on the bushing 18 in a counter-clockwise direction, and to prevent clockwise turning of the body. For this purpose a recess 48a is provided in the bushing 18 having an inclination opposite to that of the recess 48. When it is desired to adapt the tool holder for left-hand thread tools, the ball 47 and spring 49 are removed from the recess 48 and inserted in the recess 48a. Functioning of the one-position clutch is then the reverse of that described above. The recess 48a has the same relation to the driving lugs 31 and 32 as the recess 48 except that the former is on the opposite side of the center of the lugs 31 and 32.

Variations and modifications may be made within the scope of the invention and portions of the improvements may be used without others.

I claim:

1. A device of the type described having a mounting member and a tool carrier rotatably mounted with respect to the mounting member, one of said parts having a circular ball race, and the other having a spring-urged ball engaging the race, said race having a transverse groove adapted to receive a portion of the ball, and the latter being mounted for retracting movement in a direction forming an acute angle with a plane normal to the path of travel of the groove at the point of engagement of same with the ball, so that the latter prevents turning of the carrier in one direction by its engagement with a wall of the groove, but permits continued turning in the other direction; and releasable means for locking the carrier against turning, in a rotative position having a predetermined angular relation with respect to its position as locked by the ball.

2. The invention as defined in claim 1, in which the tool carrier has a cylindrical bore, in which the ball race is part of said bore, in which the mounting member has a hub engaging the bore of the carrier, and in which the spring-urged ball is mounted in the hub for movement parallel to a diameter thereof to function as set forth.

3. The invention as defined in claim 1, in which the part carrying the ball has an alternative mounting means for the latter providing for retracting movement in a direction, considering a plane normal to the path of travel of the groove at the point where it locks with the ball as a median, which is symmetrically opposite to the angular direction associated with said first ball mounting, so that the ball may be transferred to said alternative mounting to reverse its control of the carrier.

4. The invention as defined in claim 1, in which the groove has similarly concave side walls so that the fit of the ball against one wall is similar to its fit against the other wall, and in which the part carrying the ball has an alternative mounting means for the latter providing for retracting movement in a direction, considering a plane normal to the path of travel of the groove at the point where it locks with the ball as a median, which is symmetrically opposite to the angular direction associated with said first ball mounting, so that the ball may be transferred to said alternative mounting to reverse its control of the carrier.

5. A device of the type described having a mounting member; a tool carrier rotatably mounted with respect thereto; releasable means for locking the carrier against turning relative to the mounting member, including a jaw-clutch having predetermined clearances to permit re-engagement and locking of the clutch without initial exact alignment of the jaws and recesses thereof; and means including a ball-clutch operable upon release of the jaw clutch, for preventing turning of the carrier relative to the mounting member only in one direction and only at one rotative position wherein the jaws and recesses of the jaw clutch are substantially in exact alignment for re-engagement.

6. A device of the type described having a tool carrier having a cylindrical bore; a clutch face having projecting jaws located at the inner end of the bore, and secured to the tool carrier; a mounting member having an exterior cylindrical bearing surface engaging the bore of the carrier to rotatably mount the latter thereby, said member having a clutch face with jaws engaging the jaws of the carrier clutch face whereby extending axial movement of the carrier on the mounting member disengages said jaws, and said member having a spring-urged ball engaging the bore of the carrier, said bore having a longitudinally-extending groove adapted to receive a portion of the ball, and the ball being mounted for retracting movement in a direction forming an acute angle with a plane normal to the path of travel of the groove at the point of engagement of same with the ball so that the latter during extended position of the carrier permits continued turning thereof in one direction, but prevents turning in the other direction by its engagement with the groove at one position wherein both sets of clutch jaws are aligned for re-engagement.

7. A device of the type described having a mounting member; a tool carrier rotatably mounted with respect to the mounting member; releasable means for locking the carrier against relative turning with respect to the mounting member, including a two-disk jaw clutch, one disk having an eccentrically located projection with at least one edge parallel to a diameter but spaced therefrom and the other disk having a recess loosely receiving said jaw and having at least one edge adapted to engage the parallel edge of the projection; and a ball clutch operable upon release of the jaw clutch, for preventing turning of the carrier relative to the mounting member only in one direction and only at one rotative position wherein the projection of the jaw clutch is substantially in central alignment with respect to the recess thereof.

8. The invention as defined in claim 1, in which the groove has similarly concave side walls of radius greater than the ball, the fit of the ball against one wall being similar to its fit against the other wall, and in which the part carrying the ball has an alternative mounting means for the latter providing for retracting movement in a direction, considering a plane normal to the path of travel of the groove at the point where it locks with the ball as a median, which is symmetrically opposite to the angular direction associated with said first ball mounting, so that the ball may be transferred to said alternative mounting to reverse its control of the carrier.

9. The invention as defined in claim 1, in which the groove has a concave side wall of radius at least as great as the ball so that the latter engages said wall intermediate its top and bottom when fully extending into the groove and locking the carrier.

GEORGE H. COTE.